(12) United States Patent
Chaney

(10) Patent No.: US 9,995,845 B2
(45) Date of Patent: Jun. 12, 2018

(54) BOREHOLE LOGGING SENSOR AND RELATED METHODS

(71) Applicant: Reeves Wireline Technologies Limited, Leicestershire (GB)

(72) Inventor: Darren Chaney, Leicestershire (GB)

(73) Assignee: REEVES WIRELINE TECHNOLOGIES LIMITED, Leicestershire (GB)

( * ) Notice: Subject to any disclaimer, the term of this patent is extended or adjusted under 35 U.S.C. 154(b) by 0 days. days.

(21) Appl. No.: 15/291,893

(22) Filed: Oct. 12, 2016

(65) Prior Publication Data

US 2017/0108616 A1 Apr. 20, 2017

(30) Foreign Application Priority Data

Oct. 16, 2015 (GB) .................................. 1518384.1

(51) Int. Cl.
*G01V 11/00* (2006.01)
*E21B 47/12* (2012.01)
*E21B 47/01* (2012.01)

(52) U.S. Cl.
CPC ............ *G01V 11/002* (2013.01); *E21B 47/01* (2013.01); *E21B 47/12* (2013.01); *G01V 11/005* (2013.01)

(58) Field of Classification Search
CPC ........... E21B 44/02; E21B 47/00; G01F 19/00
See application file for complete search history.

(56) References Cited

U.S. PATENT DOCUMENTS

| 8,271,199 | B2 * | 9/2012 | Wang | G01V 1/48 |
| | | | | 702/9 |
| 8,861,307 | B2 * | 10/2014 | Pabon | G01V 1/46 |
| | | | | 181/104 |
| 2009/0030616 | A1 * | 1/2009 | Sugiura | G01V 11/00 |
| | | | | 702/9 |
| 2014/0214325 | A1 * | 7/2014 | Wessling | E21B 47/06 |
| | | | | 702/11 |
| 2015/0001383 | A1 * | 1/2015 | Inanc | G01T 7/005 |
| | | | | 250/252.1 |
| 2015/0337643 | A1 * | 11/2015 | Leach | E21B 41/0007 |
| | | | | 166/250.01 |
| 2016/0208596 | A1 * | 7/2016 | Ash | E21B 47/12 |

FOREIGN PATENT DOCUMENTS

| EP | 2586961 A2 | 1/2013 |
| EP | 2541284 A1 | 2/2013 |
| GB | 2334982 A | 8/1999 |
| GB | 2415257 A | 12/2005 |
| GB | 2512391 A | 1/2014 |
| WO | 9746792 A1 | 12/1997 |
| WO | 2015157651 A1 | 10/2015 |

OTHER PUBLICATIONS

Search Report mailed in co-pending GB Application No. GB1518384.1, dated Dec. 17, 2015, 2-pgs.

* cited by examiner

*Primary Examiner* — Jewel V Dowtin
(74) *Attorney, Agent, or Firm* — Blank Rome LLP

(57) ABSTRACT

A method of optimizing the cross-sectional shape of a logging tool sensor includes the step of, for a given major axis dimension, selecting the minor axis dimension such that for a circular borehole geometry the cross-sectional area of the space between the sensor and a said circular borehole with which the sensor is pressed into contact is minimized. Logging tools optimized according to this technique exhibit beneficial sensor stand-off characteristics.

19 Claims, 5 Drawing Sheets

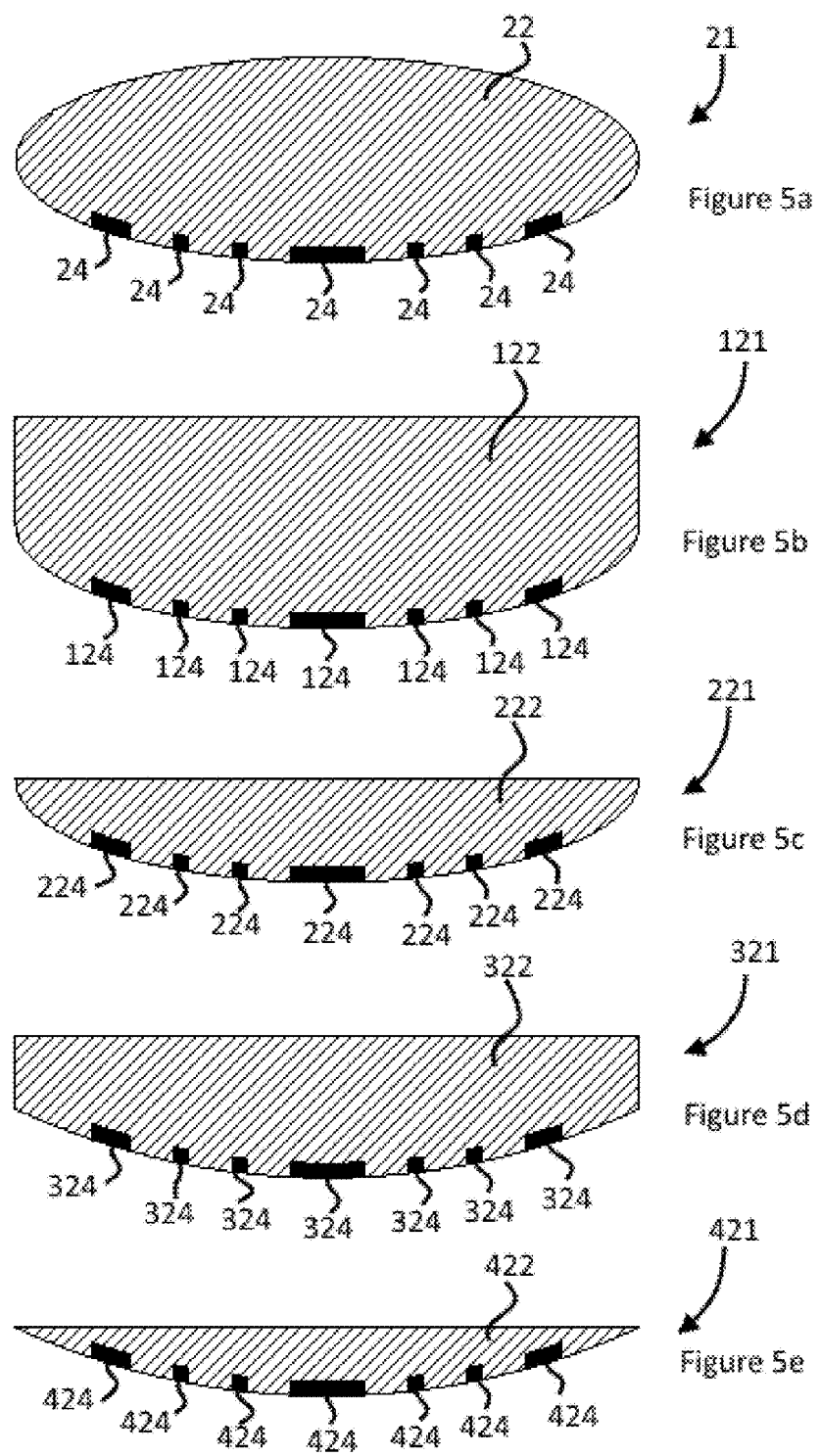

BOREHOLE LOGGING SENSOR AND RELATED METHODS

FIELD OF THE DISCLOSURE

The subject matter of the present disclosure relates to a borehole logging sensor and related methods. The disclosed subject matter also relates to logs and log data generated using the methods and apparatuses described herein.

BACKGROUND OF THE DISCLOSURE

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above both before mineral extraction activities commence and also, increasingly frequently, while they are taking place.

Broadly stated, logging involves inserting a logging tool including a section sometimes called a "sonde" into a borehole or other feature penetrating a formation under investigation; and in the majority of cases using the sonde to energize the material of the rock, etc., surrounding the borehole in some way. The sonde or another tool associated with it that is capable of detecting energy is intended then to receive emitted energy that has passed through the various components in the rock before being recorded by the logging tool.

Such passage of the energy alters its character. Knowledge of the attributes of the emitted energy and that detected after passage through the rock may reveal considerable information about the chemistry, concentration, quantity and a host of other characteristics of minerals in the vicinity of the borehole, as well as geological aspects that influence the ease with which the target mineral material may be extracted to a surface location.

Logging techniques are employed throughout the mining industry, and also in particular in the oil and gas industries. The subject matter of the present disclosure is of benefit in logging activities potentially in all kinds of mining and especially in the logging of reserves of oil and gas.

In the logging of oil, coal and gas fields (including fields combined with rock types such as shales) specific problems can arise. Broadly stated this is because it is necessary to consider a geological formation, surrounding a borehole, that typically is porous and that contains a hydrocarbon-containing fluid such as oil or gas or (commonly) a mixture of fluids only one component of which is of commercial value.

This leads to various complications associated with determining geological attributes of the oil or gas field in question. In consequence a wide variety of logging methods has been developed over the years. The logging techniques exploit physical and chemical properties of a formation usually through the use of a logging tool or sonde that as outlined above is lowered into a borehole (that typically is, but need not be, a wellbore) formed in the formation by drilling. Following such deployment usually somewhat deeply into the well the logging tool is by one means or another withdrawn towards a surface location, acquiring log data as it does so on the rock surrounding the borehole.

Typically, as noted, the tool sends energy into the formation and detects the energy returned to it that has been altered in some way by the formation. The nature of any such alteration can be processed into electrical signals that are then used to generate logs (i.e. graphical or tabular representations containing much data about the formation in question).

Depending on the logging tool design the log data acquired by the tool may be telemetered as raw signals to a surface location using a type of cable known as wireline and then processed. They may be partly or entirely processed using electronics and/or programmable devices forming part of the logging tool before being telemetered; or they can be stored in the logging tool (either as raw signals or as partly or fully processed data) for downloading after the tool has been retrieved to a surface site.

For a variety of reasons logging tools typically are elongate cylinders, of perhaps 55-200 mm in diameter. Depending on its design a logging tool may be several meters in length.

The disclosed subject matter is potentially of use in, and pertains to, all aspects of logging as described herein.

Many types of logging tool include one or more sensors that in use are pressed into contact with the wall of the borehole in which the logging tool is inserted for the purpose of acquiring log data according to methods as broadly described above.

Pressing of the sensor(s) into contact with the borehole wall (or, if present, mudcake formed on the borehole wall) is often strongly desirable in order to avoid sensor "stand-off", i.e. a gap between the surface of the sensor and the borehole wall (or mudcake).

If stand-off exists during use of the logging tool the data recorded by the tool are likely to include information about the environment inside the borehole, as opposed to the rock surrounding it. Stand-off therefore at best is inconvenient because it is necessary to correct for it when processing logging tool signals. In some cases stand-off can be so severe as to render a set of log values essentially worthless (because of the dominance of data concerning the interior of the borehole to the virtual exclusion of useful information about the surrounding rock).

Some types of logging tool include a single sensor while some others include multiple sensors that are arrayed around the circular circumference of the logging tool cylinder. In further designs one or more sensors are mounted on deployable and retractile arms or other deployment mechanisms that selectively cause the sensors to become pressed into contact with the wall of the borehole when the logging tool has been conveyed to the correct depth for the commencement of logging. The sensors often are formed as "pads", i.e. rigid e.g. arcuate or rectilinear parts of the logging tool that are designed for contact with the borehole wall.

A characteristic of many prior art logging tool sensors of the kinds described above is that they rely on the circularity of either the logging tool or of an arrangement of one or more arms when pressing the sensor into contact with the borehole wall. Many logging tool sensors have outer surfaces, that are intended to be pressed into contact with the borehole wall, having profiles that are circular arcs.

The use of a circular arc profile has the benefit of reducing to zero the sensor stand-off if the radius of curvature of the surface arc of the sensor as referred to above is the same as that of the borehole (and assuming that any rugosity of the borehole does not create stand-off by reason of non-circularity of the borehole wall profile).

On the other hand the stand-off will be reduced to zero only if the logging tool sensor is used in a borehole the radius of which matches the radius of curvature of the sensor surface. Such a sensor when used in a borehole of a different size will not conform to the borehole wall profile and hence will exhibit stand-off even if the sensor surface is pressed into point contact with the wall (or mudcake formed on it).

This in turn may mean that in order to eliminate the effects of stand-off over a range of borehole sizes it is necessary to stock a corresponding range of logging tools each of a different diameter (or at least of differing sensor surface radius of curvature) corresponding to a different borehole diameter. This is likely to be expensive and inefficient.

In view of the foregoing there is a need for improvements in the design of logging tool sensors.

SUMMARY OF THE DISCLOSURE

According to the present disclosure in a first aspect there is provided a rigid logging tool sensor the cross-section of which is generally borehole geometry-consistent over a range of borehole diameters.

Such a sensor while not providing for complete conformity, and hence zero stand-off, in respect of any one particular borehole diameter nonetheless can be designed to minimize the stand-off over a range of borehole sizes such that a single logging tool can satisfactorily be used for the range of borehole sizes. As a consequence it ceases to be necessary to stock a range of logging tools that are each specific to a borehole size.

The sensor of the present disclosure may be any of the basic types discussed herein and hence may be designed to work with a range of logging tool types.

According to a further aspect of the present disclosure, there is provided a rigid logging tool sensor the cross-sectional shape of which is an ellipse. Optionally such a sensor may be in accordance with the first aspect of the present disclosure as defined herein. If designed according to principles set out herein a logging tool sensor of elliptical profile or cross-section advantageously can be constructed to exhibit good conformity with a number of circular borehole sizes. Such a sensor is characterized by acceptable stand-off over a range of borehole sizes.

Preferably, for a given major axis dimension of the said ellipse, the minor axis dimension is optimized for a circular borehole geometry such that the area of the cross-sectional space between the sensor and a said circular borehole with which the sensor is intended to be pressed into contact is minimized. There may be created or recorded data relating to a range of such sensor designs corresponding to a plurality of circular borehole geometries. A desired elliptical major/minor axis ratio can then be chosen from the data so as to provide pad dimensions that offer optimal conformity over a specific range of borehole diameters. The range of borehole diameters may be chosen as the widest range possible, or biased towards certain specific ranges, such as but not limited to the most frequently encountered range. Other optimization criteria are also possible within the scope of the present disclosure.

An optimization technique is described herein, and also lies within the scope of the present disclosure.

In an alternative arrangement within the scope of the present disclosure the cross-sectional shape of the logging tool sensor includes a convexly curved partial ellipse that is less than the whole of an ellipse.

Including part of an ellipse, as contrasted with an entire ellipse, offers similar performance to an elliptical cross-section sensor regarding stand-off minimization, but saves on materials and, due to the difficulty of machining an elliptical shape, also saves on manufacturing costs.

In a partial ellipse design of sensor as defined herein, preferably the ellipse is truncated along a line that is parallel to the major axis of the ellipse; and further preferably the said line coincides with the major axis of the ellipse. Thus, the partial ellipse design may be considered as a flat-backed partial ellipse shape. In an alternative embodiment within the scope of the present disclosure, the sensor cross-section may be e.g. a partial ellipse backed by a rectilinear box section, a partial cylinder, or another shape.

Optionally, for a given major axis dimension of the said truncated ellipse, the minor axis dimension corresponding to half the elliptical width is optimized for a circular borehole geometry such that the cross-sectional area of the space between the sensor and a said circular borehole with which the sensor is pressed into contact is minimized. Thus, the technique for optimization of the truncated ellipse design is a counterpart of the preferred method for optimizing the fully elliptical cross-section sensor. In a similar manner to that explained above, data concerning multiple optimized ellipse cross-sections may exist and be recorded.

Preferably, the dimensions of the transverse cross-sectional shape of the logging tool are optimized for a range of major axis dimensions of the said ellipse or the said truncated ellipse in order to provide a plurality of optimized cross-sectional shapes. This aspect of the present disclosure is explained in more detail herein.

A range of sensor types, especially but not limited to sensors designed to be pressed against borehole walls, advantageously may be designed in accordance with the principles of the present disclosure. Thus, the sensor preferably is selected from the non-exhaustive list including an acoustic logging sensor, a nuclear logging sensor, a resistivity logging sensor, a permittivity sensor, a conductivity logging sensor, or a nuclear magnetic resonance sensor.

The subject matter of the present disclosure also resides in a method of optimizing the cross-sectional shape of an elliptical logging tool sensor as described above including the step of, for a given major axis dimension of the said ellipse, selecting the minor axis dimension such that for a circular borehole geometry the cross-sectional area of the space between the sensor and a said circular borehole with which the sensor is pressed into contact is minimized.

The subject matter of the present disclosure further resides in a method of optimizing the cross-sectional shape of a logging tool sensor as described above including the step of, for a given major axis dimension of the said truncated ellipse, selecting the minor axis dimension corresponding to half the elliptical width such that for a circular borehole geometry the cross-sectional area of the space between the sensor and a said circular borehole with which the sensor is pressed into contact is minimized.

Optionally, the method includes the step of repeating the aforementioned optimization steps in respect of a range of minor axis dimensions of the said ellipse or the said truncated ellipse to optimize in a range of borehole diameters in order to provide a plurality of optimized cross-sectional shapes and choosing a specific cross-sectional shape so that the cross-sectional area between the pad and the borehole wall is substantially minimized for a specific range of borehole sizes. The disclosed subject matter may then include the further step of selecting from the plurality of optimized cross-sectional shapes one or more cross-sectional shapes that minimize stand-off in a chosen range of borehole geometries. A variety of criteria may be used in the selection process.

Other optimization criteria are also possible within the scope of the present disclosure.

The scope of the present disclosure includes a logging tool including a logging tool sensor according to the present disclosure as defined hereinabove; and to log data generated using such a logging tool.

The subject matter of the present disclosure further extends to method of using such a logging tool, the method including the steps of (a) deploying the logging tool in a borehole; (b) causing the logging tool sensor to be pressed against the wall of the borehole so as to minimize the cross-sectional area of the space between the sensor and the borehole wall; and (c) drawing the logging tool along the borehole while operating the logging tool to acquire log data.

A method of this kind optionally includes the step of storing, displaying, transmitting, processing, or printing the log data or a log derived therefrom.

DESCRIPTION OF THE DRAWINGS

FIGS. 5a-5e illustrate the cross-sections of a number of elliptical, part-elliptical, and/or part-circular sensor pads, according to the present disclosure.

There now follows a description of preferred embodiments of the present disclosure, by way of non-limiting example, with reference being made to the accompanying figures.

DETAILED DESCRIPTION

Figure 1:
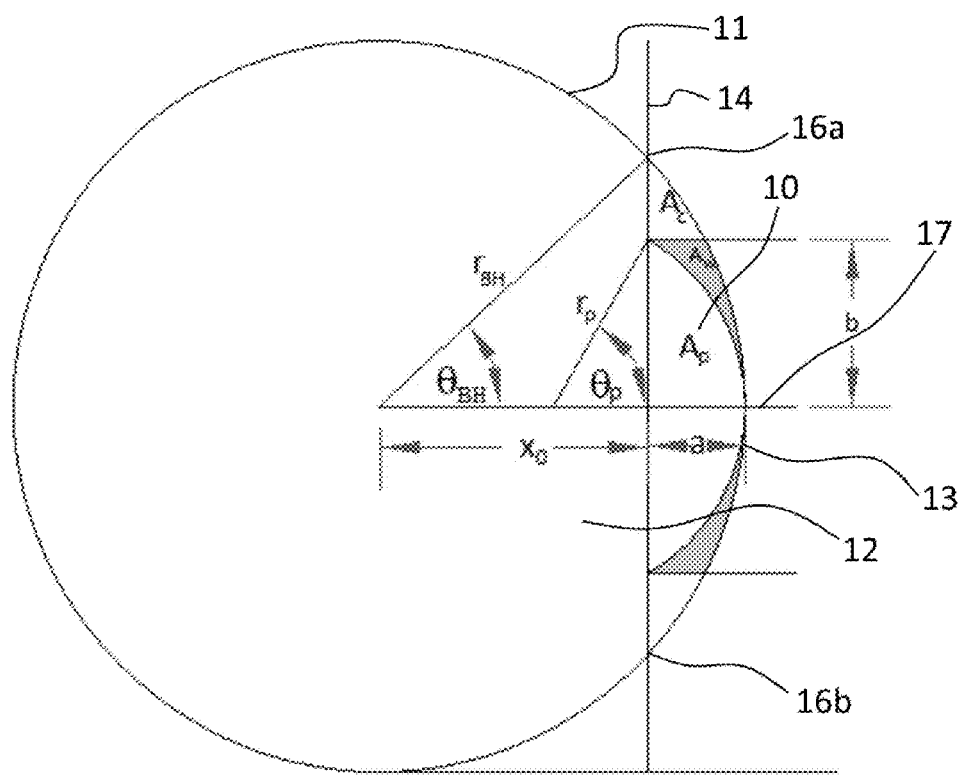
FIG. 1 illustrates in schematic form a circular or part-circular prior art logging tool sensor pad that is pressed into contact with the wall of a circular borehole, and illustrates by way of shading the extent of stand-off of the sensor pad.

Referring to the drawings, there is shown in FIG. 1 a prior art sensor pad 10 that in practice would be supported in a cylindrical, elongate logging tool such that the convexly curved outer surface 13 of the sensor pad 10 is presented on the exterior of the logging tool and can be pressed into contact with the wall 11 of a borehole 12.

In FIG. 1, the features of the logging tool are omitted for ease of presentation. The sensor pad and the borehole are shown transversely sectioned. The sensor pad is of essentially a D-shaped cross-section, having a truncated circular profile such that the surface 13 is a circular arc. The features of the sensor pad 10 described below for the most part would also be present in a sensor pad of fully circular cross-section.

The shaded area $A_w$ visible in FIG. 1 is representative of the extent of stand-off of the sensor pad 10. This is the area enclosed by projection of the shape of the surface 13 onto the borehole wall 11.

In FIG. 1, the line 14 is the chord corresponding to truncation of the circle of which the surface 13 forms part. Chord line 14 intersects the borehole wall 11 at two points 16a, 16b as illustrated. The angle subtended at one of these intersection points 16a between the radius $r_{BH}$ of the borehole 12 and line 17 normal to the surface 13 is designated as $\theta_{BH}$. The angle subtended between the radius $r_p$ of the circle defining the surface 13 and the normal line 17 is $\theta_p$.

The area of the chord of the borehole enclosed by chord line 14 and borehole wall 11 is designated as $A_c$ and the area of the sensor pad 10 enclosed by chord line 14 and surface 13 is $A_p$. The distance along normal line 17 from the center of the borehole 12 to the chord line 14 is $x_0$ and the remainder of the distance from the chord line 14 along the normal line 17 to the borehole wall is a. The distance along chord line 14 from normal line 17 to the intersection of chord line 14 with the surface 13 of the sensor pad 10 is b.

If $r_{BH} > r_p$ as illustrated in FIG. 1, the area $A_w$ is given by:

$$A_w = A_{BH} - A_p - A_c = \qquad (1)$$

$$\frac{r_{BH}}{2}[\theta_{BH} - \sin(\theta_{BH})\cos(\theta_{BH})] - \frac{r_p}{2}[\theta_p - \sin(\theta_p)\cos(\theta_p)] -$$

$$\int_0^{\tan\left[\sin^{-1}\left(\frac{b}{r_{BH}}\right)\right]-x_0} \sqrt{r_{BH}^2 - (x - x_0)} - b dx$$

where $\theta_p = \sin^{-1}(b/r_p)$, $\theta_{BH} = \sin^{-1}(x_0/r_{BH})$ and $x_0 = (r_{BH} - a)$.

In the event that $r_{BH} \leq r_p$, the integral ($A_c$) in Equation 1 vanishes and $x_0 = \cos(x_0/r_{BH})$.

Figure 4:
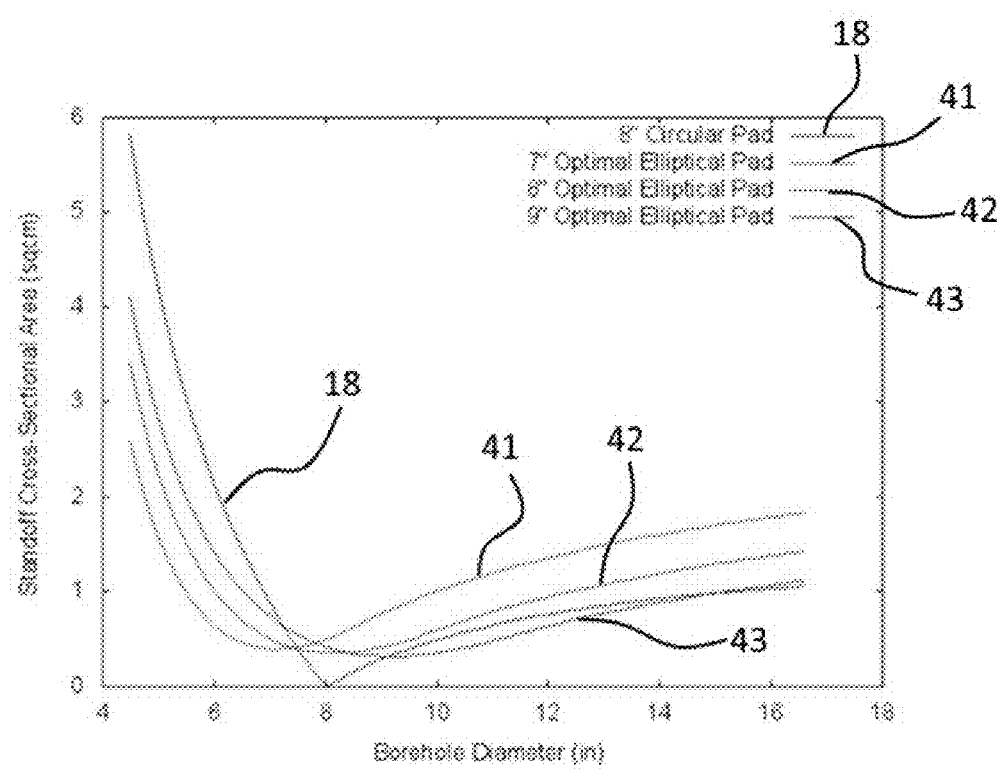
FIG. 4 is a series of plots comparing the extent of stand-off of a series of elliptical or part-elliptical logging tool sensor pads according to the present disclosure with the extent of stand-off of a circular logging tool sensor pad.

If, for the sake of example, the radius $r_p$ is 100 mm (4 inches), the sensor pad 13 will fit snugly into a 200 mm (8 inch) diameter borehole with no stand-off, and the area $A_w$ is zero. Such a sensor pad inserted into other sizes of borehole larger than 200 mm in diameter however exhibits varying amounts of stand-off as illustrated by line 18 of FIG. 4, which line plots the value of $A_w$ against the diameter of the borehole in which the sensor pad is deployed. As illustrated by FIG. 4, the degree of stand-off is significant for most values of borehole diameter other than that corresponding to the value of $r_p$.

A borehole as employed in e.g. the oil and gas extraction industries usually has a diameter measured in the range 7 to 9 inches, being the diameters of drill heads commonly in use. As is apparent from FIG. 4, the stand-off of a part-circular cross-section sensor pad in which $r_p$ is 100 mm (4 inches) is significant in 7 inch and 9 inch or larger diameter boreholes. As explained above at the least this is a significant inconvenience in log signal processing.

Figure 2:
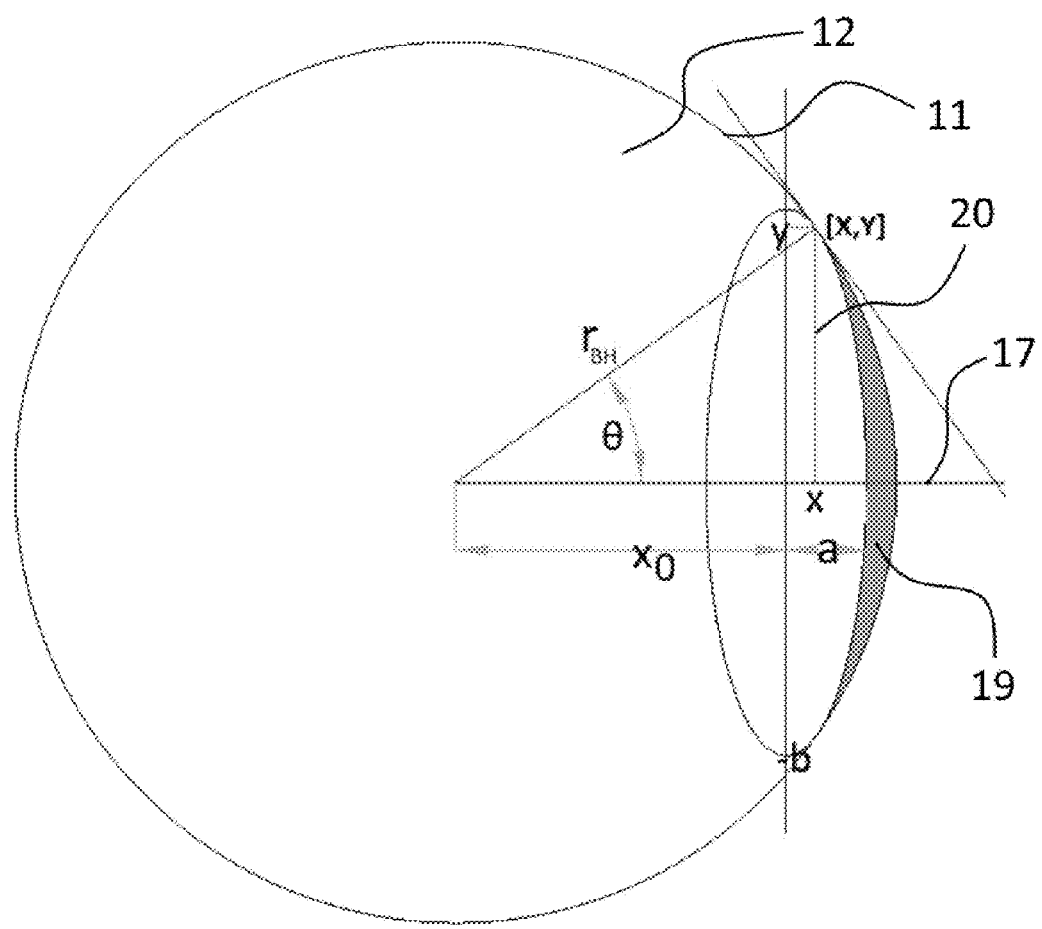
FIG. 2 is a view similar to FIG. 1 illustrating an elliptical or truncated elliptical logging tool sensor pad similarly pressed into contact with the circular borehole wall, and again indicating the extent of stand-off by way of shading.

Referring now to FIG. 2, there is shown one form of logging tool sensor pad 20 according to the present disclosure. Sensor pad 20 is made of rigid materials and therefore does not conform fully to the shape of a borehole in which it is deployed. An aim of the present disclosure therefore is to optimize the design of the sensor pad 20 in order to minimize the sensor pad stand-off that derives from the inability of the sensor pad to change shape in order to conform to the borehole shape.

In FIG. 2, the sensor pad 20 is shown in cross-sectional view inserted into a borehole 12 having a circular cross-section wall 11. Thus the borehole 12 in FIG. 2 is the same as the borehole 12 of FIG. 1. In like manner to FIG. 1, FIG.

2 omits for clarity other features of the logging tool that support the sensor pad 20 and cause it to be pressed against the wall 11 of the borehole 12. Although feature 20 is referred to as a sensor pad, this component could be constructed in a form other than that of a pad per se. The principles of the present disclosure in other words apply to sensors of elliptical or part-elliptical cross-section whether constituted as recognizable "pads" or not.

In FIG. 2, the ellipse representing the cross-section of the sensor pad 20 has a minor radius a and a major radius b. The ellipse may be regarded as having been translated along the normal line 17 by a distance $x_0$ from the center of the borehole cross-section and in a direction perpendicular to the normal line 17, again measured with respect to the center of the borehole cross-section, by a distance $y_0$.

As is apparent from FIG. 2, an elliptical sensor pad 20 of the size illustrated contacts the circumferential borehole wall 11 at two points. In FIG. 2 the co-ordinates of the upper such point are denoted as (X, Y). The angle subtended between the radius $r_{BH}$ of the borehole intersecting point (X, Y) and the normal line 17 is signified by θ in FIG. 2.

The stand-off of the sensor pad 20 is denoted by the shaded area 19 in FIG. 2. A comparison of this area 19 with area $A_w$ of FIG. 1 can be used to assess whether the stand-off of particular design of elliptical or part-elliptical sensor of the present disclosure is superior to that of the circular cross-section sensor pad 10 of the prior art.

The expressions describing the elliptical sensor pad 20 of FIG. 2 are:

$$b^2x^2 + a^2y^2 = 1 \quad (2)$$

$$(x-x_0)^2 + (y-y_0)^2 = r_{BH}^2 \quad (3)$$

Substituting the co-ordinates X, Y into the equation of a circle gives $Y = \sqrt{(r^2 - (X-x_0)^2)}$. Substituting this expression for Y into the equation for an ellipse gives $b^2X^2 + a^2[r_{BH}^2 - (X-x_0)^2] - a^2b^2 = 0$ which is quadratic in X. This is solved in the usual way to give:

$$X = \frac{-x_0 a^2 \pm \sqrt{x_0^2 a^4 - (b^2 - a^2)(a^2 r_{BH}^2 - x_0^2 a^2 - a^2 b^2)}}{b^2 - a^2} \quad (4)$$

The gradient of the tangential line at the point [X, Y] can be found by implicit differentiation of the equation of an ellipse (Equation 3) to give $y' = b^2X/(a^2Y)$. The gradient of the radius of the circle at point [X, Y] is then $M = a^2Y/(b^2X) = \tan\theta = Y/(X-x_0)$. Rearranging gives $X = x_0 a^2/(a^2 - b^2)$. Equating this to the expression for X in Equation 4 gives the result:

$$x_0 = \sqrt{\frac{b^2 r_{BH}^2 - b^4 - a^2 r_{BH}^2 + a^2 b^2}{b^2}} \quad (5)$$

As the radius of the borehole is increased beyond a certain limit, the contact will change from two point to single point. Two point contact occurs when $a \geq b^2/r_{BH}$ and single point contact occurs thereafter. Above this limit, the relation $x_0 = r_{BH} - a$ holds.

The cross-sectional area between the pad and the borehole wall (the shaded area 19 in FIG. 2) can be found by integration to give the expression:

$$A = 2\left[\int_0^{r_{BH}+x_0} \sqrt{r_{BH}^2 - (x-x_0)^2}\, dx - \int_0^{x_0 - \sqrt{r_{BH}^2 - b^2}} -b + \sqrt{r_{BH}^2 - (x-x_0)}\, dx - \frac{\pi ab}{4}\right] \quad (6)$$

Figure 3:
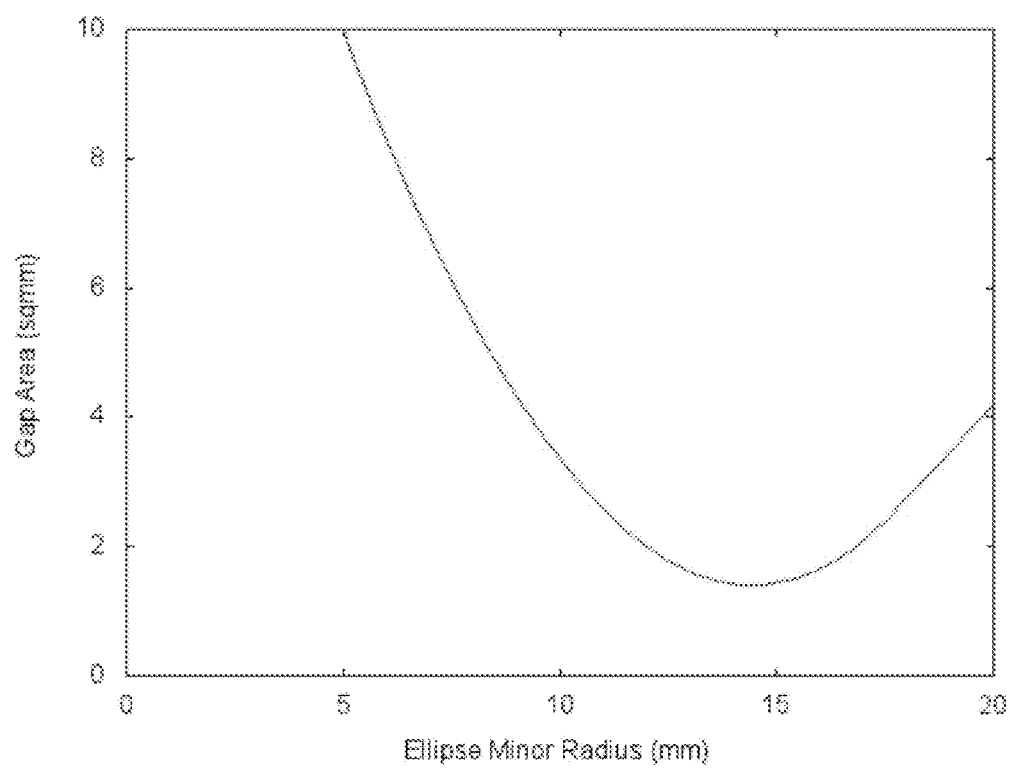
FIG. 3 shows the variance of the extent of stand-off of the elliptical sensor pad of FIG. 2 with variation of ellipse minor axis dimension.

For a fixed ellipse major radius b and borehole radius $r_{BH}$, it is possible to find the optimal fit by minimising equation 4 with respect to the pad ellipse minor radius a. For an 8" (200 mm) diameter borehole a plot of gap area A as a function of ellipse minor radius a is shown in FIG. 3. For a pad major diameter of 85 mm, the optimum minor diameter for an 8" (203 mm) borehole is 28.28 mm (radius 14.14. mm).

The foregoing optimization technique forming part of the present disclosure may readily be repeated for differing borehole sizes and elliptical cross-section axis combinations. As desired the optimization aspect of the present disclosure can be automated e.g. using a suitably programmed digital computer.

A desired elliptical major/minor axis ratio can then be chosen from the resulting plurality of data so as to provide pad dimensions that offer optimal conformity over a specific range of borehole diameters. The range of borehole diameters may be chosen e.g. as the widest range possible, or may be biased towards certain specific ranges such as the most frequently encountered range of borehole diameter. Other optimization criteria are also possible and within the scope of this present disclosure.

FIG. 4 shows the cross-sectional stand-off area for a prior art circular or 'D'-shaped pad optimized for an 8" (200 mm) diameter borehole compared to elliptical pads optimized for 7" (175 mm), 8" (200 mm) and 9" (230 mm) diameter boreholes. The stand-off values are represented in FIG. 4 by respective plot lines 41, 42 and 43. Although the elliptical pad 20 of the present disclosure is never fully optimal for any particular borehole diameter, it beneficially displays a smaller cross-sectional stand-off area over a wider range of borehole sizes than the traditional 'D'-shaped pad cross-section.

As noted, one design of sensor pad 20 according to the present disclosure exhibits a partially elliptical cross-section. Such sensor pads also can be optimized using the technique described above since it is necessary to optimize the dimensions only of the side of the elliptical profile that contacts the borehole. The opposite face of the sensor pad can from the standpoint of borehole contact optimization be of any shape, including flat planes that therefore define truncated elliptical shapes.

A plot such as FIG. 4 may beneficially be used in the selection of an optimal sensor design from a range of such designs created in accordance with the method of the present disclosure as specified. Thus for example plot line 41 indicates the standoff cross-sectional area as a function of borehole diameter for an ellipse of 3.35 inch (85 mm) major axis dimension the minor axis dimension of which is optimized to provide the least standoff in a 7 inch (approximately 180 mm) diameter borehole. Such a pad would provide superior standoff minimization compared to the other pad designs considered in the FIG. 4 in boreholes diameters that are less than approximately 7.5 inches (approximately 190 mm). Plot line 43 shows the standoff cross-sectional area as a function of borehole diameter for an ellipse of 3.35 inch (85 mm) major axis dimension the minor axis dimension of which is optimized to provide the least standoff in a 9 inch (approximately 230 mm) diameter borehole. This pad would provide superior standoff minimization compared to the other pad designs in FIG. 4 when the borehole diameter is in the range 8.5 inches to 15 inches (approximately 215 mm to 380 mm).

The foregoing represents one way, of several, in which optimization of the sensor design can take place when selecting from a range of individually optimized ellipse cross-section sizes.

The line of truncation of such a sensor pad may be parallel to the major axis of the elliptical shape and indeed in some embodiments of the present disclosure may coincide with the major axis. In other embodiments however this need not be the case.

A number of elliptical, part-elliptical and part-circular cross-section sensor pads is shown in FIGS. 5a to 5e. In each of FIGS. 5a to 5e various exemplary electrodes are schematically represented by the numerals 24, 124, 224, 324, and 424. In each of these figures the electrodes adopt the shapes and positions of the electrodes of a pad of a microlaterolog (resistivity) logging device. This is for illustration purposes only however, and a variety of other electrode arrangements is possible within the scope of the present disclosure.

In such arrangements, it need not necessarily be the case that the electrodes are exposed on the surface of a sensor as illustrated; and on the contrary it is possible for the electrodes to be covered, or embedded in the sensors.

Moreover, some logging tool pad designs may not require the presence of recognizable electrodes at all. All such variants sensor design are within the scope of the present disclosure as broadly defined herein.

The electrodes when present may be connected in various ways known to the person of skill in the art in order to give rise to operational logging tool sensor constructions.

The variant sensor 21 of FIG. 5a includes a substrate 22 of fully elliptical cross-section.

The sensor profile in FIG. 5b includes a substrate 122 of the sensor 121 essentially of D-profile.

In FIG. 5c, a further non-flat sensor variant 221 is shown, in which the substrate 222 is a truncated version of the substrate 121 of FIG. 5b.

The cross-section of sensor 321 illustrated in FIG. 5d includes a convexly curved, part-circular front face of substrate 322 in which the electrodes 324 are secured. The rear face of the substrate 322 is cuboidal as shown.

The sensor 421 of FIG. 5e differs from that of FIG. 5d by reason of the line of truncation defining the rear face of the substrate 422 being a chord of the circle of which the front face supporting the electrodes 424 is part.

The sensor examples of FIGS. 5a to 5e are not intended to be limiting of the scope of the present disclosure, and are merely illustrative of the fact that numerous sensor profiles may be adopted, it being desirable principally that the as illustrated front convexly curved surface of the sensor is capable of conforming to the profile of a section of borehole wall with a minimal air gap or stand-off. The dimensional optimization method of the present disclosure described herein may readily be applied for this purpose to sensors such as those shown in FIGS. 5a to 5e.

As mentioned herein, use of any sensor pad according to the present disclosure may include (a) deploying the logging tool in a borehole (e.g. by supporting a logging tool including such a pad on wireline or on drill pipe); (b) causing the logging tool sensor to be pressed against the wall of the borehole so as to minimize the cross-sectional area of the space between the sensor and the borehole wall (e.g. by activating a caliper arm that presses the entire logging tool, including the sensor pad, into contact with the borehole wall; or by activating an extensible arm or other member on which the sensor pad of the present disclosure is mounted); and (c) drawing the logging tool along a borehole (e.g. by winding in or paying out wireline; or withdrawing or adding stands of drill pipe) while operating the logging tool to acquire log data. Such log data may, depending on the design of the logging tool, be transmitted in real time to a surface location or may be stored or processed within the logging tool. The resulting log data may be further stored, downloaded, uploaded, transmitted, displayed, printed, or otherwise processed as data values, data signals or as recognizable data logs.

Step (c) may include as necessary relieving the force pressing the sensor pad into contact with the borehole wall in order to permit the logging tool to move as described, and subsequently again exerting the force in order to permit logging to re-commence.

The methods of using logging tools described herein include conventional aspects of logging tool operation, such as but not limited to the generation of electrical signals indicative of log data; and the transformation of those signals to further signals that may be presented e.g. in a display or in printed form as one or more logs. Such aspects are known to the person of skill in the art and are not described in detail herein.

Preferences and options for a given aspect, feature or parameter of the present disclosure should, unless the context indicates otherwise, be regarded as having been disclosed in combination with any and all preferences and options for all other aspects, features, and parameters of the present disclosure.

The listing or discussion of an apparently prior-published document in this specification should not necessarily be taken as an acknowledgement that the document is part of the state of the art or is common general knowledge.

What is claimed is:

1. A rigid logging tool sensor comprising a cross-section being generally borehole geometry-consistent over a range of borehole diameters and comprising a transverse cross-sectional shape being an ellipse.

2. The rigid logging tool sensor according to claim 1, wherein for a given major axis dimension of the ellipse, a minor axis dimension is optimized for a circular borehole geometry such that an area of a cross-sectional space between the sensor and the circular borehole geometry with which the sensor is pressed into contact is minimized.

3. The rigid logging tool sensor according to claim 1, wherein the major and minor axis dimensions of the transverse cross-sectional shape are optimized for a range of circular borehole geometries.

4. A method of optimizing the cross-sectional shape of the rigid logging tool sensor according to claim 1, the method including the step of, for a given major axis dimension of the ellipse, selecting a minor axis dimension such that for a circular borehole geometry a cross-sectional area of a space between the sensor and the circular borehole geometry with which the sensor is pressed into contact is minimized.

5. The method of optimizing the cross-sectional shape of the rigid logging tool sensor according to claim 4, including the step of, for the given major axis dimension of the ellipse, selecting the minor axis dimension corresponding to half an elliptical width such that for the circular borehole geometry the cross-sectional area of the space between the sensor and the circular borehole geometry with which the sensor is pressed into contact is minimized.

6. The method according to claim 4, comprising repeating the step of selecting in respect of a plurality of axis dimensions of the ellipse in order to provide a plurality of optimized cross-sectional shapes.

7. The method according to claim 6, including the further step of selecting from the plurality of optimized cross-sectional shapes one or more of the cross-sectional shapes that minimize stand-off in a chosen range of the circular borehole geometries.

8. A logging tool including the rigid logging tool sensor according to claim 1 disposed thereon.

9. A method of using a logging tool including the rigid logging tool sensor according to claim 1, the method including the steps of (a) deploying the logging tool in a borehole; (b) causing the rigid logging tool sensor to be pressed against a wall of the borehole so as to minimize a cross-sectional area of a space between the sensor and the borehole wall; and (c) drawing the logging tool along the borehole while operating the logging tool to acquire log data.

10. The method according to claim 9, the method further including the step of storing, displaying, transmitting, processing or printing the log data or a log derived therefrom.

11. A rigid logging tool sensor comprising a cross-section being generally borehole geometry-consistent over a range of borehole diameters and comprising a cross-sectional shape including a convexly curved partial ellipse being less than a whole of an ellipse.

12. The rigid logging tool sensor according to claim 11, wherein the cross-sectional shape is truncated along a line that is parallel to a major axis of the ellipse.

13. The rigid logging tool sensor according to claim 11, wherein the cross-sectional shape is truncated along a line that is parallel to a major axis of the ellipse, and wherein the line coincides with the major axis of the ellipse.

14. The rigid logging tool sensor according to claim 11, wherein for a given major axis dimension of the partial ellipse a minor axis dimension corresponding to half an elliptical width is optimized for a circular borehole geometry such that a cross-sectional area of a space between the sensor and the circular borehole geometry with which the sensor is pressed into contact is minimized.

15. The rigid logging tool sensor according claim 11, wherein major and minor axis dimensions of the partial ellipse comprises a transverse cross-sectional shape optimized for a range of circular borehole geometries.

16. The rigid logging tool sensor according to claim 11, wherein the sensor comprises an acoustic logging sensor, a nuclear logging sensor, a resistivity logging sensor, a permittivity sensor, a conductivity logging sensor, or a nuclear magnetic resonance sensor.

17. A logging tool including the rigid logging tool sensor according to claim 11 disposed thereon.

18. A method of using a logging tool including the rigid logging tool sensor according to claim 11, the method including the steps of (a) deploying the logging tool in a borehole; (b) causing the rigid logging tool sensor to be pressed against a wall of the borehole so as to minimize a cross-sectional area of a space between the sensor and the borehole wall; and (c) drawing the logging tool along the borehole while operating the logging tool to acquire log data.

19. The method of according to claim 18, the method further including the step of storing, displaying, transmitting, processing or printing the log data or a log derived therefrom.

* * * * *